United States Patent [19]

Sekizawa et al.

[11] Patent Number: 4,639,807
[45] Date of Patent: Jan. 27, 1987

[54] MAGNETIC DETECTOR HAVING MAGNETORESISTIVE ELEMENTS

[75] Inventors: Sadao Sekizawa; Toshio Seki; Tadashi Takahashi, all of Hitachi, Japan

[73] Assignee: Hitachi, Ltd., Tokyo, Japan

[21] Appl. No.: 475,519

[22] Filed: Mar. 15, 1983

[30] Foreign Application Priority Data

Mar. 15, 1982 [JP] Japan .................................. 57-39574

[51] Int. Cl.$^4$ ............................ G11B 5/127; G01B 7/14
[52] U.S. Cl. ..................................... 360/113; 324/208; 324/252
[58] Field of Search ................. 360/113; 324/252, 208; 338/32 R

[56] References Cited

U.S. PATENT DOCUMENTS

| | | | |
|---|---|---|---|
| 4,039,936 | 8/1977 | Jones et al. | 338/32 R |
| 4,403,187 | 9/1983 | Takahashi et al. | 338/32 R |
| 4,418,372 | 11/1983 | Hayashida et al. | 360/113 |

Primary Examiner—Robert S. Tupper
Assistant Examiner—Andrew L. Sniezek
Attorney, Agent, or Firm—Antonelli, Terry & Wands

[57] ABSTRACT

A magnetic detector for detecting the angle, position speed of rotation of a rotating body or the rectinear position, distance or speed of a rectinearly moving body is used opposite to a magnetic recording medium. The magnetic detector includes a plurality of elongated stripe-shaped magnetoresistive elements juxtaposed on a non-magnetic substrate. Bridge output terminals are provided adjoining to first identical ends of the respective magnetoresistive elements in the longitudinal directions thereof while common terminals are disposed adjoining to second ends of the magnetoresistive elements. Either bridge output or common terminals extend round the outside of the magnetoresistive elements to positions adjacent to the common or bridge output terminals. Thus, the total width of the magnetoresistive elements pattern can be greatly reduced, thereby providing a magnetic detector of high performance in which the influence of fluctuations of gap or spacing between the magnetic detector and the magnetic recording medium used together therewith.

10 Claims, 12 Drawing Figures

MAGNETIC DETECTOR HAVING MAGNETORESISTIVE ELEMENTS

BACKGROUND OF THE INVENTION

The present invention relates to a magnetic detector using magnetoresistive elements. The magnetic detector can be applied to magnetically detect the angle, position or speed of rotation of a rotating body or the rectinear position, distance or speed of a rectinearly moving body. The applications include the detection of the angle or number of rotation(s) of an electric motor and the control of the rotational speed based thereon, the detection of the quantity of feeding of the working arm or cutting tool of an automatic machine such as a robot and the control of the feed speed based thereon, or the detection of the quantities of various feedings in business machines such as a copier or printer and the control of the feed quantities based thereon.

When it is desired to determine the rotational position of a magnetic recording medium, for example, a magnetic detector (hereinafter referred to as magnetic head) is provided with a magnetoresistive element arranged opposite to the magnetic recording medium which moves relative thereto. Such a magnetic head is disclosed in, for example, Japanese Patent Application Laid-Open No. 87862/81 entitled "Magnetic Head for Rotation Detector".

FIG. 1A shows the arrangement pattern of magnetoresistive elements disclosed in the Japanese Patent Application Laid-Open No. 87862/81. In the figure, reference numeral 3A-1 designates a magnetic recording medium and numeral 4A generally designates a magnetic head. Reference numeral 5A designates a magnetoresistive element pattern in the magnetic head, numeral 6A a non-magnetic substrate, symbols a to d terminals for external connection, and symbols $R_{11}$, $R_{12}$, $R_{21}$, $R_{22}$, $R_{31}$, $R_{32}$, $R_{41}$ and $R_{42}$ magnetoresistive elements formed on the terminals. The magnetic recording medium 3A-1 shown in FIG. 1A is an enlarged version of a portion of a drum-like magnetic recording medium shown in FIG. 3 which will be later described. FIG. 1B shows a bridge circuit for the magnetoresistive element pattern 5A.

As shown in FIG. 1A, magnetic poles N and S are recorded in the magnetic recording medium 3A-1 at regular intervals, and the magnetoresistive element pattern 5A includes the terminals a to d for external connection. The magnetoresistive elements are arranged between the terminals a to d so as to form the bridge circuit shown in FIG. 1B.

Ones of the magnetoresistive elements making up an arm of the bridge circuit, for example, the elements $R_{11}$ and $R_{12}$ are combined in U-shaped hairpin configuration. Therefore, when the recording pitch of the magnetic poles N or S is expressed by $\lambda$, it is required that the total width of all the magnetoresistive elements forming the bridge circuit is $(2+\frac{3}{4})\lambda$ as understood from FIG. 1A.

In many rotation detectors, it is also required to determine the direction of rotation, and therefore two outputs having a phase difference therebetween are provided. In this case, a pair of bridge circuits are required and hence the total width of magnetoresistive elements will be more than twice larger than $(2+\frac{3}{4})\lambda$.

FIGS. 2 and 3 illustrate how the magnetic head having the above-described magnetoresistive elements is combined with a magnetic recording medium which is to be detected by the magnetic head. In these figures, reference numeral 1 designates a motor, numeral 2 a shaft of the motor, numeral 3A a disc-like magnetic recording medium, numeral 3A-1 a drum-like magnetic recording medium, and numerals 4A and 4A-1 magnetic heads. In the arrangement shown in FIG. 2, the magnetic head 4A is disposed opposite to one side surface of the disc-like magnetic recording medium 3A. In the arrangement shown in FIG. 3, the magnetic head 4A-1 is provided opposite to the outer peripheral surface of the drum-like magnetic recording medium 3A-1 extending in the derection of drum axis. One of these arrangements is selected in accordance with demand.

The amplitude of a detection signal output derived from a magnetoresistive element corresponds to only a 2 to 3% in terms of the change in resistance thereof. Moreover, this change in resistance greatly depends upon the distance between the magnetoresistive element and the magnetic recording medium (hereinafter referred to as "spacing"), as disclosed in Japanese Patent Application Laid-Open No. 90213/81. FIG. 4 shows a relation between the spacing and the output amplitude of a magnetoresistive element. As is apparent from the figure, the output amplitude exhibits remarkable decrease as the spacing becomes larger. In a rotation detector using a magnetoresistive element with such a characteristic as a detecting element, therefore, it is important that the spacing does not change so that the output amplitude is kept constant.

In order to obtain stable spacing, the arrangement shown in FIG. 3, is more advantageous than that shown in FIG. 2 since a machining operation for suppressing the roughness of the outer peripheral surface of a drum in the drum axis direction can be performed with higher accuracy as compared with that for suppressing the roughness of the side surface of a disc and since when the magnetic recording medium is incorporated into a machine a variation in spacing due to any load in the drum axis direction is negligible.

In the arrangement shown in FIG. 3, however, there is a problem that when the total width W of magnetoresistive elements is large, a substantial difference exists between the spacing $S_1$ for a magnetoresistive element located at the central portion of a magnetic head and the spacing $S_2$ for a magnetoresistive element located at the peripheral portion of the magnetic head, as shown in FIG. 5. Namely, though the central magnetoresistive elements give large output amplitudes, the outer magnetoresistive elements will give small output amplitudes, thereby resulting in an insufficient bridge circuit output or an unusual distortion of the detection signal waveform.

Thus, when the combination of magnetoresistive elements in hairpin configuration as shown in FIG. 1A are used in the arrangement of FIG. 3, the above-mentioned inconvenience arises due to the large total width of magnetoresistive elements. The same inconvenience will arise even in the arrangement of FIG. 2 when the spacing between the magnetic head and the disc-like magnetic recording medium is not uniform.

SUMMARY OF THE INVENTION

An object of the present invention is to provide a magnetic detector which is scarcely affected by the spacing and has a high sensitivity of detection.

In the present invention, an elongated stripe-shaped magnetoresistive element is used instead of the combination of two magnetoresistive elements, and a plurality of such stripe-shaped magnetoresistive elements are arranged to form a bridge circuit.

According to the present invention, there is provided a magnetic detector used in an arrangement close to and opposite to a magnetic recording medium with a relative movement provided between the magnetic detector and the magnetic recording medium, the magnetic detector comprising a plurality of elongated stripe-shaped magnetoresistive elements formed in juxtapositional relation with one another on a non-magnetic substrate, bridge output terminals provided adjoining to respective one-side ends of said magnetoresistive elements in the longitudinal directions thereof, and a common terminal arrangement provided adjoining to the other-side ends of said magnetoresistive elements in the longitudinal directions thereof, said common terminal arrangement extending round the outside of said magnetoresistive elements to a position adjacent to said bridge output terminals provided at said one-side ends of said magnetoresistive elements.

According to the present invention, there is also provided a magnetic detector used in an arrangement close to and opposite to a magnetic recording medium with a relative movement provided between the magnetic detector and the magnetic recording medium, the magnetic detector comprising a plurality of elongated stripe-shaped magnetoresistive elements formed in juxtapositional relation with one another on a non-magnetic substrate, a common terminal arrangement provided adjoining to one-side ends of said magnetoresistive elements in the longitudinal directions thereof, and bridge output terminals provided adjoining to the respective other-side ends of said magnetoresistive elements in the longitudinal directions thereof, said bridge output terminals extending round the outside of said magnetoresistive elements to positions adjacent to said common terminal arrangement provided at said one-side ends of said magnetoresistive elements.

These and further objects, features and advantages of the present invention will become more obvious from the following description when taken in connection with the accompanying drawings which show, for purposes of illustration only, several embodiments in accordance with the present invention.

DESCRIPTION OF THE PREFERRED EMBODIMENTS

Figure 1A:
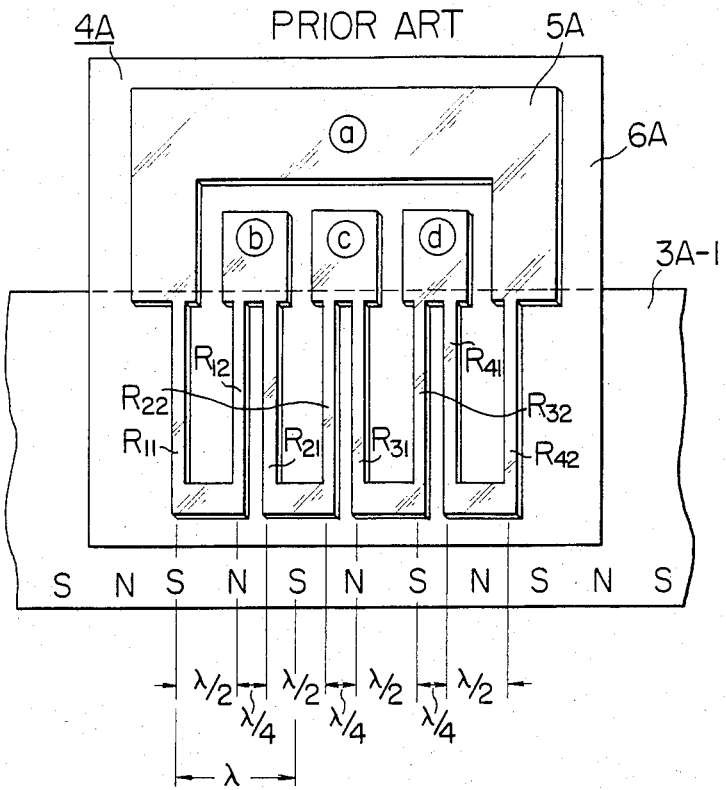
FIG. 1A schematically shows the construction of a magnetic head proposed in Japanese Patent Application Laid-Open No. 87862/81 together with a magnetic recording medium used in connection therewith.
Figure 1B:
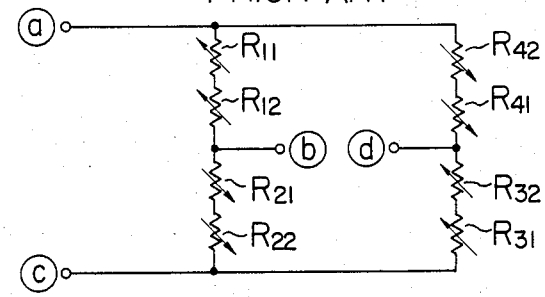
FIG. 1B is a circuit diagram showing a bridge circuit which is formed by the magnetoresistive element pattern showing in FIG. 1A.
Figure 2:
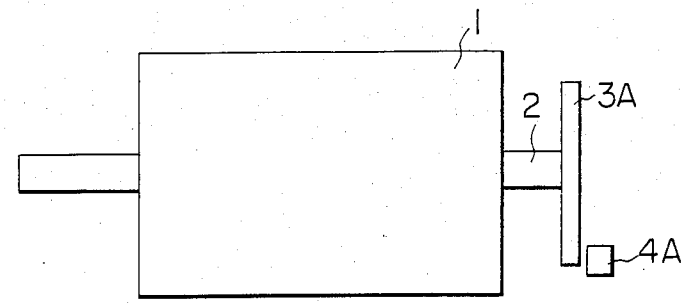
FIGS. 2 and 3 are schematic views showing different arrangements in which a magnetic head is associated with a magnetic recording medium to be detected by the magnetic head.

Preferred embodiments for practicing the present invention will now be explained referring to the drawings.

Figure 6B:
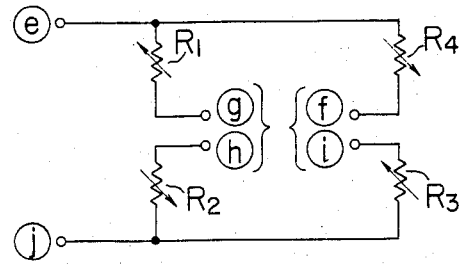
FIG. 6B is a circuit diagram showing a bridge circuit which is formed by the magnetoresistive element pattern shown in FIG. 6A.
Figure 6A:
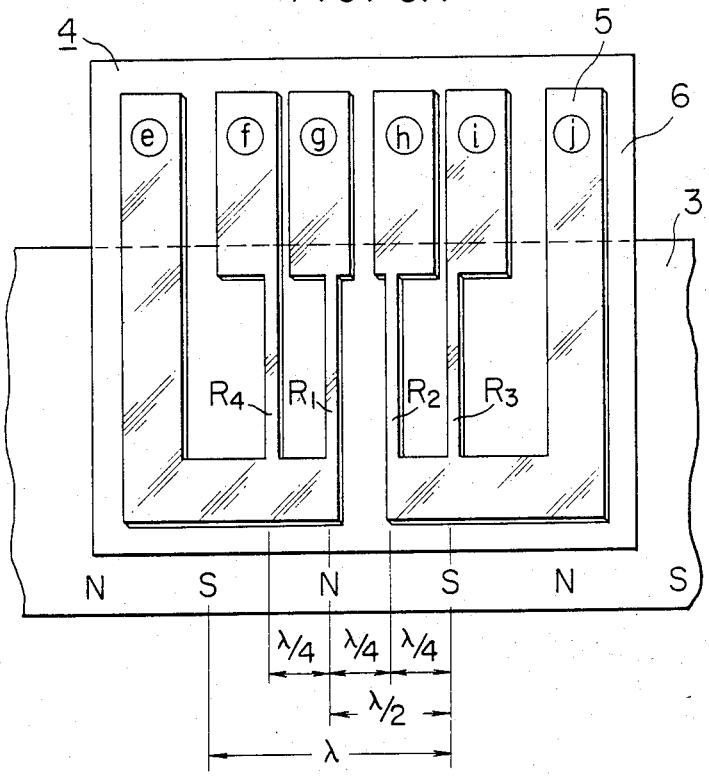
FIG. 6A schematically shows the construction of a magnetic head according to an embodiment of the present invention together with a magnetic recording medium used in connection therewith.

A magnetic head (magnetic detector) according to an embodiment of the present invention is shown in FIG. 6A. A one-phase output is provided in the present embodiment. FIG. 6B shows a bridge circuit formed in the magnetic head.

Referring to FIGS. 6A and 6B, reference numeral 3 designates a magnetic recording medium, numeral 4 a magnetic head, numeral 5 a magnetoresistive element pattern, numeral 6 a non-magnetic substrate, symbols e to j common and bridge output terminals to be used for external connection, and symbols $R_1$ to $R_4$ magnetoresistive elements each arranged between the terminals and having the shape of an elongated stripe.

Figure 3:
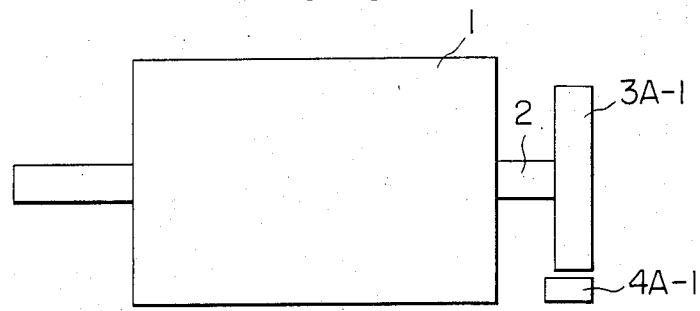
Figure 4:
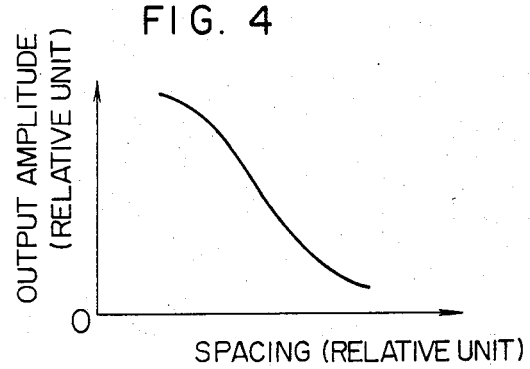
FIG. 4 is a graph generally showing a relation between the head-to-medium spacing and the output amplitude of a magnetoresistive element.

The magnetic recording medium 3 shown in FIG. 6A is an enlarged version of a portion of a drum-like magnetic recording medium as shown in FIG. 3. Magnetic poles S and N are recorded in the recording medium 3 at regular intervals.

The magnetoresistive element pattern 5 is formed on the non-magnetic substrate 6 of a single chip through evaporation and etching techniques. The magnetoresistive elements $R_4$, $R_1$, $R_2$ and $R_3$ in this pattern are arranged to form a differential bridge circuit shown in FIG. 6B. The pattern is grouped into one set of magnetoresistive elements $R_1$ and $R_4$ and the other set of magnetoresistive elements $R_2$ and $R_3$. The terminals e and j are used as common terminals while the terminals f, g, h and i are used as bridge output terminals. The bridge output terminals has two pairs so that a differential output is provided between the pair of terminals g and h and the pair of terminals f and i.

More especially, in the embodiment shown in FIGS. 6A and 6B, the elongated stripe-shaped magnetoresistive elements $R_1$ to $R_4$ formed in juxtapositional relation with one another on the non-magnetic substrate 6 are arranged to form a differential bridge circuit. The bridge output terminals f, g, h and i adjoining to respective one-side ends of the magnetoresistive elements $R_4$, $R_1$, $R_2$ and $R_3$ in the longitudinal directions thereof has one pair of terminals g and h and the other pair of terminals f and i in accordance with the differential bridge configuration. The common terminal e (or j) adjoining to the other-side ends of the magnetoresistive elements $R_4$ and $R_1$ (or $R_2$ and $R_3$) in the longitudinal directions thereof, has a width larger than the width of the magnetoresistive elements, goes round the outside of the magnetoresistive elements $R_4$ and $R_1$ (or $R_2$ and $R_3$) and extends to a position adjacent to the bridge output terminal f. That is, the common terminal e (or j) extends along the outerside face of the outermost magnetoresistive element $R_4$ (or $R_3$).

With such a construction, the magnetic head can be provided with four magnetoresistive elements $R_1$ to $R_4$ though the conventional magnetic head shown in FIG. 1A has eight magnetoresistive elements $R_{11}$ to $R_{42}$. Each elongated stripe-shaped element in the present embodiment corresponds to the combination of two elements in hairpin configuration in FIG. 1A.

When the magnetoresistive elements $R_1$ to $R_4$ are arranged at an interval of $\lambda/4$ in the shown order, the resultant arrangement is equivalent to the arrangement of FIG. 1A in terms of phase. As a result, a bridge configuration providing a differential output can be realized.

Though it is desirable to construct the pair of the bridge output terminals g and h (or f and i) into one unit, the crossing of the terminals are not allowed since they are formed on a single substrate through evaporation and etching techniques. Therefore, each of two bridge output terminals actually required in the bridge circuit is divided into a pair of bridge output terminals g and h (or f and i), and the paired terminals are used in an external interconnection fashion.

Figure 5:
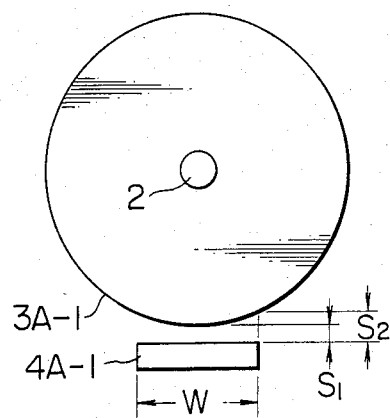
FIG. 5 is a view for explaining how the spacing changes depending upon the total width of magnetoresistive elements when a drum-like magnetic recording medium is employed.

With such a structure, all of the common and bridge output terminals can be arranged on one side as in the conventional magnetic head shown in FIG. 1A, and the total width of four magnetoresistive elements forming a bridge circuit may be only $\frac{3}{4}\lambda$. This total width is three elevenths of the total width of magnetoresistive elements in the conventional magnetic head. Accordingly, when the magnetic head 4 and the magnetic recording medium 3 are arranged as shown in FIG. 5, the difference between the inner and outer magnetoresistive elements with respects to the spacing thereof relative to the magnetic recording medium is very small.

Figure 7:
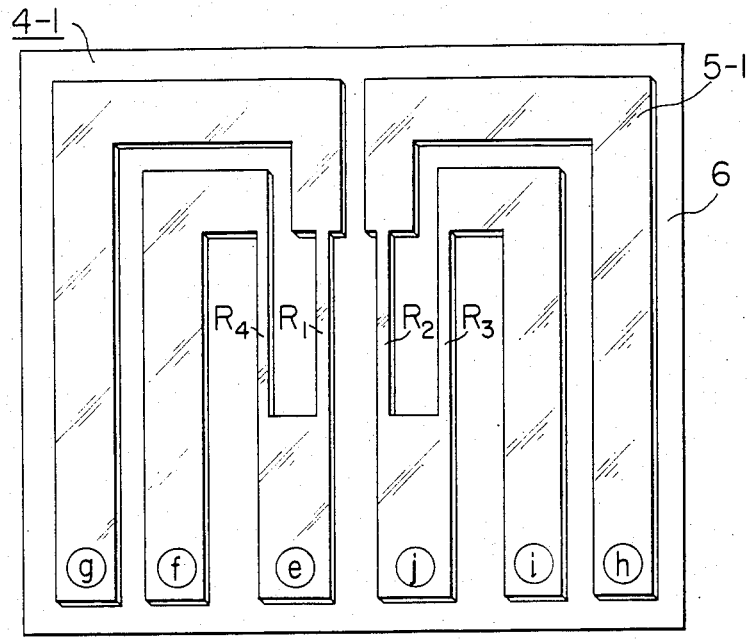
FIG. 7 schematically shows the magnetoresistive element pattern of a magnetic head according to another embodiment of the present invention.

FIG. 7 shows the magnetoresistive element pattern of a magnetic head according to another embodiment of the present invention. In FIGS. 6A and 7, like parts are given the same reference numerals or symbols. In FIG. 7, reference numeral 4-1 designates a magnetic head, and numeral 5-1 a magnetoresistive element pattern.

The present embodiment is the same as the embodiment of FIG. 6A in that a plurality of elongated stripe-shaped magnetoresistive elements $R_1$ to $R_4$ are arranged in a differential bridge configuration and bridge output terminals has one pair of terminals g and h and the other pair of terminal f and i in accordance with the differential bridge configuration.

However, the bridge output terminals f and g (or h and i) adjoining to the ends of the magnetoresistive elements $R_4$ and $R_1$ (or $R_2$ and $R_3$) have a width larger than the width of each of the magnetoresistive elements, go around the outside of the magnetoresistive elements $R_4$ and $R_1$ (or $R_2$ and $R_3$), and extend to positions adjacent to a common terminal e (or j) provided adjoining to another ends of the magnetoresistive elements $R_4$ and $R_1$ (or $R_2$ and $R_3$). That is, the bridge output terminals f and g (or h and i) extend along an outerside face of the outermost one of the magnetoresistive elements $R_4$ (or $R_3$). In other words, the present embodiment employs the roundabout configuration of bridge output terminals though the embodiment shown in FIG. 6A employs the roundabout configuration of common terminals. But, the same effect is obtained.

As mentioned previously, many types of rotation detectors provide two outputs having a phase difference therebetween. The teaching of the present invention can exhibit a more remarkable effect when the two pairs of bridge circuits are required. This will now be explained.

Let us assume that the phase difference is $\lambda/8$. According to the proposal in the Japanese Patent Application Laid-Open No. 87862/81, the magnetoresistive element pattern in the two-phase scheme take a form shown in FIG. 8. Then, the total width of magnetoresistive elements $R_{11}$ to $R_{82}$ is given by $$(2+\tfrac{3}{8})\lambda + \tfrac{3}{8}\lambda + (2+\tfrac{3}{8})\lambda = 45/8\lambda.$$

Figure 8:
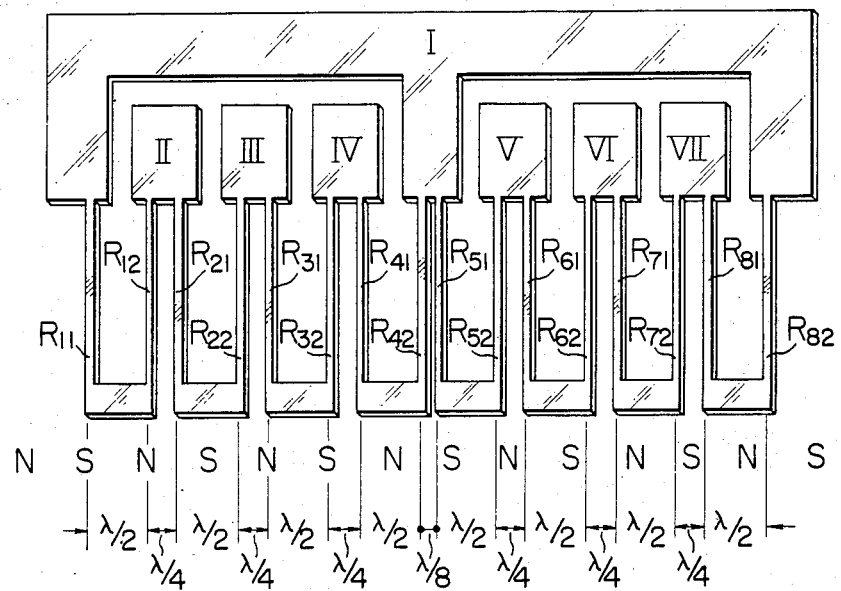
FIG. 8 schematically shows the magnetoresistive element pattern of a magnetic head proposed in the Japanese Patent Application Laid-Open No. 87862/81 in which two outputs having a phase difference therebetween are provided.

In FIG. 8, I, III and VI designate common terminals, and II, IV, V and VII bridge output terminals for providing two differential outputs.

Figure 9A:
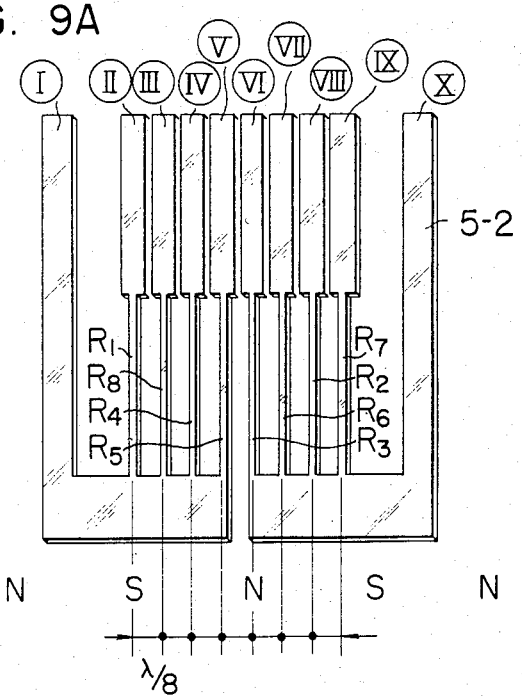
FIG. 9A schematically shows the magnetoresistive element pattern of a magnetic head according to a further embodiment of the present invention in which two outputs having a phase difference therebetween are provided.
Figure 9B:
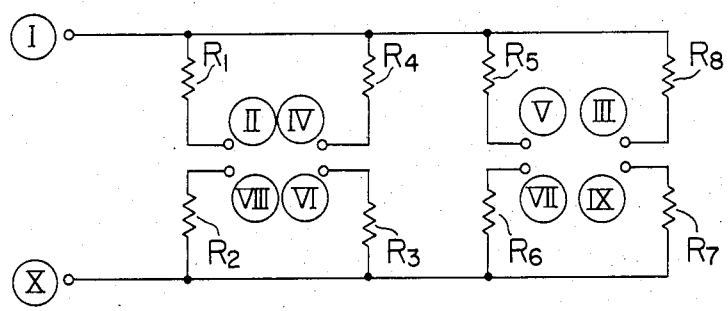
FIG. 9B is a circuit diagram showing a bridge circuit which is formed by the magnetoresistive element pattern shown in FIG. 9A.

FIG. 9A shows the magnetoresistive element pattern of two-phase scheme in a magnetic head according to a further embodiment of the present invention, and FIG. 9B shows bridge circuits formed by this magnetoresistive element pattern. The present embodiment is similar in structure to the embodiment shown in FIGS. 6A and 6B. As understood from FIG. 9A, the total width of magnetoresistive elements $R_1$ to $R_8$ is only $7/8\lambda$ which is seven forty-fifths of the total length $45/8\lambda$ required in the conventional magnetic head shown in FIG. 8. Thus, the magnetic head according to the present embodiment can be greatly reduced in size. In FIG. 9A, reference numeral 5-2 designates the magnetoresistive element pattern, symbols I and X common terminals, II to IX bridge output terminals which are used in four-pair (II and VIII, IV and VI, V and VII, and III and IX) fashion.

In each of the foregoing embodiments, a plurality of magnetoresistive elements can be arranged at the minimum pitch or at intervals of a phase difference required between the elements. Accordingly, even when a magnetic head is arranged opposite to the outer peripheral surface of a magnetic recording medium as shown in FIG. 3, the spacing is substantially uniform so that a constant detection signal may be produced. Thus, a rotation detector of high performance can be obtained. This is because the size of the magnetic head can be greatly reduced.

In the above-mentioned embodiments, magnetic heads as rotation detector have been explained. However, the present invention is not limited to such magnetic heads, but can be used for various purposes. Further, the present invention is applicable not only to a differential bridge configuration but also to other bridge configurations. Furthermore, the present invention is not limited to one or two bridge circuits, but is applicable to three or more bridge circuits. Additionally, bridge output terminals may be provided in any paired or combined fashion in accordance with the bridge configuration used.

The present invention is applied not only to a magnetic detector for detecting the angle, position and speed of rotation of a rotating body, but also to a magnetic detector for detecting the rectinear distance, position and speed of a rectinearly moving body. Thus, the present invention is widely used to various magnetic detectors which use magnetoresistive elements.

What is claimed is:

1. A magnetic detector used in an arrangement close to and opposite to a magnetic recording medium with a relative movement provided between the magnetic detector and the magnetic recording medium, the magnetic detector comprising:

a plurality of elongated stripe-shaped magnetoresistive elements formed in juxtapositional relation with one another on a non-magnetic substrate, each magnetoresistive element extending in a longitudinal direction transverse to the direction of relative movement between the magnetic detector and the magnetic recording medium and having a first and a second end;

bridge output terminals connected to respective first ends of said magnetoresistive elements in the longitudinal directions thereof; and common terminal means having one end connected to the second ends of at least two of said magnetoresistive elements in the longitudinal directions thereof, said common terminal means having an intermediate portion with a width larger than the width of each of the magnetoresistive elements and extending along and parallel to an outerside face of the outermost one of said elongated longitudinally extending magnetoresistive elements to another end portion at a position adjacent to said bridge output terminals provided at said first ends of said magnetoresistive elements, whereby the magnetic detector has a small width and high sensitivity.

2. A magnetic detector according to claim 1, wherein four of said bridge output terminals are provided and they are used in two-pair fashion for providing one bridge circuit.

3. A magnetic detector according to claim 1, wherein eight of said bridge output terminals are provided and they are used in four-pair fashion for providing two bridge circuits.

4. A magnetic detector used in an arrangement close to and opposite to a magnetic recording medium with a relative movement provided between the magnetic detector and the magnetic recording medium, the magnetic detector comprising:

a plurality of elongated stripe-shaped magnetoresistive elements formed in juxtapositional relation with one another on a non-magnetic substrate, each of said magnetoresistive elements extending in a longitudinal direction transverse to the direction of relative movement between the magnetic detector and the magnetic recording medium and having a first and a second end;

common terminal means connected to at least two of said first ends of said magnetoresistive elements in the longitudinal directions thereof; and bridge output terminals having one end portion connected to the respective second ends of said magnetoresistive elements in the longitudinal directions thereof, each of said bridge output terminals having an intermediate portion with a width larger than the width of each of said magnetoresistive elements and extending parallel to and along an outerside face of the outermost one of said longitudinally extending magnetoresistive elements to another end portion positioned adjacent to said common terminal means provided at said first ends of said magnetoresistive elements.

5. A magnetic detector according to claim 4, wherein four of said bridge output terminals are provided and they are used in two-pair fashion for providing one bridge circuit.

6. A magnetic detector adapted to be arranged close to and opposite to a magnetic recording medium having a magnetic signal recorded therein for detecting the magnetic signal, a relative movement being provided between the magnetic detector and the magnetic recording medium, said magnetic detector comprising:

a plurality of magnetoresistive elements formed on a non-magnetic substrate so as to extend in a longitudinal direction transverse to the direction of said relative movement, each of said magnetoresistive elements having first and second ends which are opposite to each other in the longitudinal direction;

a plurality of first terminals connected to the first ends of said magnetoresistive elements, respectively; and at least one second terminal having one end portion commonly connected to the second ends of at least two of said magnetoresistive elements, said second terminal having an intermediate portion with a width larger than the width of each of said magnetoresistive elements, said intermediate portion of said second terminal extending parallel to and along a side face of a predetermined one of said longitudinally extending magnetoresistive elements to another end portion positioned adjacent to the first terminals connected to the first ends of said magnetoresistive elements, said second terminal being made of the same material as said magnetoresistive elements.

7. A magnetic detector according to claim 6, wherein each of said magnetoresistive elements has a shape of elongated stripe.

8. A magnetic detector according to claim 7, wherein the intermediate portion of said second terminal extends parallel to and along an outerside face of the outermost one of said magnetoresistive elements.

9. A magnetic detector according to claim 8, wherein four of said magnetoresistive elements, four of said first terminals and two of said second terminals are provided, one of said two second terminals being commonly connected to the second ends of two of said four magnetoresistive elements while the other of said two second terminals is commonly connected to the second ends of the other two of said four magnetoresistive elements, and said four first terminals are used as bridge output terminals in two-pair fashion to provide one bridge circuit.

10. A magnetic detector according to claim 8, wherein eight of said magnetoresistive elements, eight of said first terminals and two of said second terminals are provided, one of said two second terminals being commonly connected to the second ends of four of said eight magnetoresistive elements while the other of said two second terminals is commonly connected to the second ends of the other four of said eight magnetoresistive elements, and said eight first terminals are used as bridge output terminals in four-pair fashion to provide two bridge circuits.

* * * * *